United States Patent
Ryu et al.

(10) Patent No.: US 9,412,154 B2
(45) Date of Patent: Aug. 9, 2016

(54) DEPTH INFORMATION BASED OPTICAL DISTORTION CORRECTION CIRCUIT AND METHOD

(71) Applicant: Samsung Electronics Co., Ltd., Suwon-si (KR)

(72) Inventors: Se-Un Ryu, Seongnam-si (KR); Nyeong-Kyu Kwon, Daejeon (KR); Woong-Hee Lee, Hwaseong-si (KR); Jong-Hwa Lee, Gwangmyeong-si (KR)

(73) Assignee: Samsung Electronics Co., Ltd. (KR)

( * ) Notice: Subject to any disclaimer, the term of this patent is extended or adjusted under 35 U.S.C. 154(b) by 10 days.

(21) Appl. No.: 14/470,358

(22) Filed: Aug. 27, 2014

(65) Prior Publication Data
US 2015/0077596 A1    Mar. 19, 2015

(30) Foreign Application Priority Data

Sep. 13, 2013    (KR) .................. 10-2013-0110476

(51) Int. Cl.
| | | |
|---|---|---|
| *H04N 5/217* | (2011.01) | |
| *G06T 5/00* | (2006.01) | |
| *H04N 5/77* | (2006.01) | |

(52) U.S. Cl.
CPC .............. *G06T 5/006* (2013.01); *H04N 5/217* (2013.01); *G06T 2200/04* (2013.01); *G06T 2207/10028* (2013.01); *H04N 5/772* (2013.01)

(58) Field of Classification Search
CPC .............................. H04N 5/217; H04N 5/772
USPC ......................................................... 348/241
See application file for complete search history.

(56) References Cited

U.S. PATENT DOCUMENTS

| | | | |
|---|---|---|---|
| 7,245,761 | B2 | 7/2007 | Swaminathan et al. |
| 7,636,106 | B2 | 12/2009 | Kumaki |
| 7,800,681 | B2 | 9/2010 | Azuma |
| 2005/0231616 | A1 | 10/2005 | Iwai et al. |
| 2007/0126892 | A1 | 6/2007 | Guan |
| 2011/0115938 | A1 | 5/2011 | Han |
| 2011/0228142 | A1* | 9/2011 | Brueckner ........... H04N 5/3572 348/241 |
| 2015/0077596 | A1* | 3/2015 | Ryu ....................... G06T 5/006 348/241 |

FOREIGN PATENT DOCUMENTS

| | | |
|---|---|---|
| JP | 05110926 | 4/1993 |
| JP | 2006293035 | 10/2006 |
| JP | 2007206789 | 8/2007 |
| JP | 2008085773 | 4/2008 |
| JP | 2008227996 | 9/2008 |
| JP | 2009281661 | 12/2009 |

* cited by examiner

*Primary Examiner* — Antoinette Spinks
(74) *Attorney, Agent, or Firm* — Onello & Mello, LLP

(57) ABSTRACT

Provided are a depth information based optical distortion correction (ODC) circuit and method. The ODC circuit includes a depth acquisition unit acquiring a depth of an image, a grid generation unit dynamically generating a correction grid corresponding to the depth of the image using depth information of the image and a projection matrix, and a distortion correction unit correcting optical distortion in the image using the correction grid. The corrected image can then be stored, transmitted, or otherwise output. The image can be a single static image or photograph or a frame in a video recording.

17 Claims, 11 Drawing Sheets

DEPTH INFORMATION BASED OPTICAL DISTORTION CORRECTION CIRCUIT AND METHOD

CROSS-REFERENCE TO RELATED APPLICATION

This application claims priority from Korean Patent Application No. 10-2013-0110476 filed on Sep. 13, 2013 in the Korean Intellectual Property Office, and all the benefits accruing therefrom under 35 U.S.C. 119, the contents of which are incorporated herein by reference in its entirety.

FIELD

The present invention relates to a depth information based optical distortion correction circuit and method.

BACKGROUND

Optical distortion (ODC), also referred to as lens distortion correction, is used to correct optical distortion in an image generated that is attributable to curvature characteristics of a lens. A general optical distortion correction circuit stores a correction grid and corrects optical distortion in the image using the stored correction grid. Alternatively, the general optical distortion correction circuit may store a plurality of correction grids in the form of a look-up table (LUT) and may correct optical distortion in each of a plurality of images, including images having various depths, using the stored correction grids.

However, when the same correction grid is used for different images that have different extents of optical distortion due to their different depths (e.g., far and near), accuracy of correcting optical distortion may be lowered. In addition, even if a plurality of correction grids are stored in the LUT, it is not possible to store the correction grids corresponding to all possible depths; consumption of a memory space for storing the correction grids may increase the greater the number of correction grids to be stored.

SUMMARY

The present invention, comprising a depth module and a grid correction module, supports the dynamic grid correction by using depth parameters without the need for various LUTs (look up tables). As a result, the present invention can reduce the necessary grid memory and obtain high accurate grid for any kind of scene.

The present invention provides a depth information based optical distortion correction (ODC) circuit and method, which can dynamically generate correction grids corresponding to various depths of an image.

The present invention also provides a depth information based optical distortion correction circuit and method, which can increase accuracy of correcting optical distortion by generating correction grids corresponding to all possible depths.

The present invention also provides a depth information based optical distortion correction circuit and method, which can reduce consumption of a memory space for storing correction grids.

These and other objects of the present invention will be described in or be apparent from the following description of the preferred embodiments.

According to an aspect of the present invention, there is provided a depth information based optical distortion correction (ODC) circuit. The ODC circuit includes a depth acquisition unit configured to acquire a depth of an image, a grid generation unit configured to dynamically generate a correction grid corresponding to the depth of the image using depth information of the image and a projection matrix, and a distortion correction unit configured to correct optical distortion in the image using the correction grid.

In various embodiments, the grid generation unit may be configured to generate coordinates of the correction grid using coordinates of an original grid, the depth information of the image, and the projection matrix.

In various embodiments, the ODC may further comprise a projection matrix calculation unit configured to calculate the projection matrix using: an optical distortion in at least two images captured by an image sensor and having different depths; and depth information of the at least two images.

In various embodiments, the ODC circuit may further comprise a distortion calculation unit configured to compare the at least two images with the original grid and to calculate the optical distortion of each of the at least two images.

In various embodiments, the depth acquisition unit is configured to acquire the depths of the at least two images.

In various embodiments, the ODC circuit may further comprise a storing unit storing the projection matrix.

In various embodiments, the depth acquisition unit may be configured to acquire a depth of at least one frame among a plurality of frames captured by an image sensor.

In various embodiments, the depth acquisition unit may be configured to acquire the depth of the image using a stereo depth extraction algorithm.

In various embodiments, the depth acquisition unit may be configured to acquire the depth of the image using an auto focus (AF) algorithm.

In various embodiments, the depth acquisition unit may be configured to acquire the depth of the image provided from a time of flight (TOF) sensor.

In various embodiments, the depth acquisition unit may be configured to acquire the depth of the image input by a user.

According to another aspect of the present invention, there is provided a depth information based optical distortion correction (ODC) method. The ODC method includes acquiring a depth of an image; dynamically generating a correction grid corresponding to the depth of the image using the depth information of the image and the projection matrix; and correcting optical distortion in the image using the correction grid.

In various embodiments, the dynamically generating of the correction grid corresponding to the depth of the image may comprise dynamically generating coordinates of the correction grid using coordinates of an original grid, the depth information of the image, and the projection matrix.

In various embodiments, the ODC method may further comprise pre-processing to generate the projection matrix, wherein the pre-processing can comprise: acquiring at least two images having different depths; and calculating the projection matrix using optical distortion in the at least two images and depths of the at least two images.

In various embodiments, the pre-processing may further comprise storing the projection matrix in a storage media.

In accordance with another aspect of the invention, provide is an imaging system with depth information based optical distortion correction (ODC). The system comprises a memory having stored therein a projection matrix; an image sensor configured to receive an optical image signal from an image captured through at least one lens and to convert the received optical image signal into an electrical image signal; an image signal processor configured to process the electrical image signal into a distortion corrected optical image. The image signal processor comprises a depth acquisition unit configured to acquire a depth of the image; a grid generation unit configured to dynamically generate a correction grid corresponding to the depth of the image using depth information of the image and the projection matrix; and a distortion correction unit configured to correct optical distortion in the image using the correction grid. The system further comprises a display controller configured to output the corrected optical image to a display.

In various embodiments, the grid generation unit may be configured to generate coordinates of the correction grid using coordinates of an original grid, the depth information of the image, and the projection matrix.

In various embodiments, the system may comprise a projection matrix calculation unit configured to calculate the projection matrix using an optical distortion in at least two images captured by an image sensor and having different depths and depth information of the at least two images.

In various embodiments, the system may further comprise a distortion calculation unit configured to compare the at least two images with the original grid and to calculate the optical distortion of each of the at least two images.

In various embodiments, the depth acquisition unit is configured to acquire the depth of the image using an auto focus (AF) algorithm; a time of flight (TOF) sensor; or by an input by a user.

In various circuits, methods, and/or systems in accordance with aspects of the present invention, the image may be a static image or photograph or a frame of a video image.

In various circuits, methods, and/or systems in accordance with aspects of the present invention, the image processing and image distortion correction may be in real time or near real time.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE EMBODIMENTS

Figure 1:
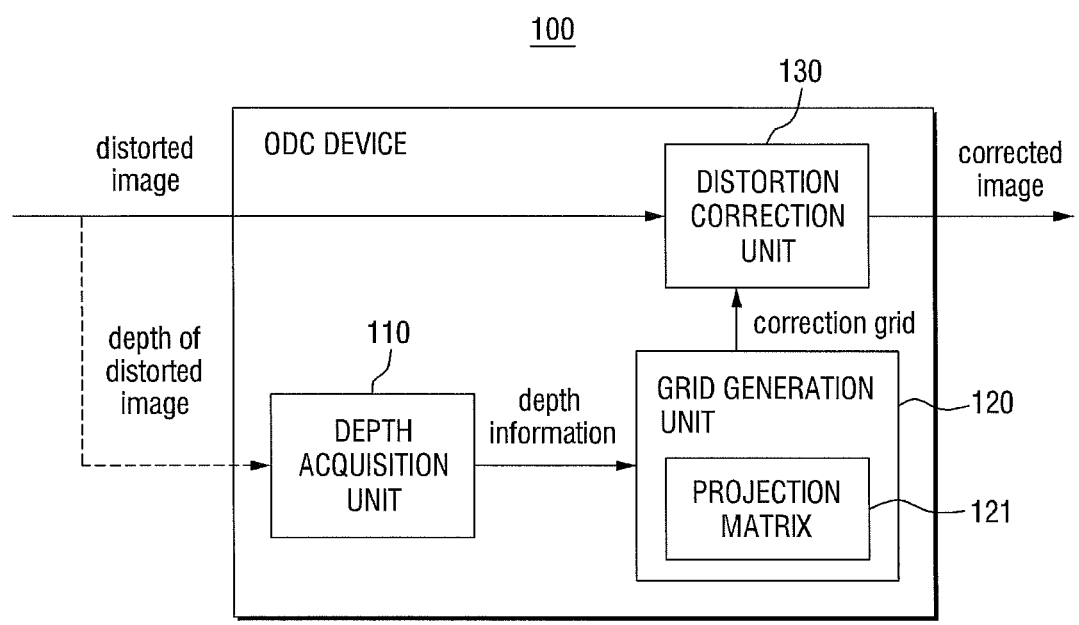
FIG. 1 is a block diagram of an embodiment of a depth information based optical distortion correction (ODC) circuit according to aspects of the present invention.

Aspects of the present invention will now be described more fully hereinafter with reference to the accompanying drawings, in which preferred embodiments of the invention are shown. This invention may, however, be embodied in different forms and should not be construed as limited to the embodiments set forth herein. The same reference numbers indicate the same components throughout the specification, unless otherwise indicated or understood. In the attached figures, the thickness of layers and regions is exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Aspects of the present invention will be described with reference to perspective views, cross-sectional views, and/or plan views, in which preferred embodiments of the invention are shown. Thus, the profile of an exemplary view may be modified according to manufacturing techniques and/or allowances. That is, the embodiments in accordance with the invention are not intended to limit the scope of the present invention, but cover all changes and modifications that can be caused due to a change in manufacturing process. Thus, regions shown in the drawings are illustrated in schematic form and the shapes of the regions are presented simply by way of illustration and not as a limitation.

Hereinafter, an embodiment of a depth information based optical distortion correction (ODC) circuit according to aspects of the present invention will be described with reference to FIGS. 1 to 3.

FIG. 1 is a block diagram of an embodiment of a depth information based optical distortion correction (ODC) circuit according to aspects of the present invention.

Referring to FIG. 1, the ODC circuit 100 includes a depth acquisition unit 110, a grid generation unit 120, and a distortion correction unit 130.

The depth acquisition unit 110 may be configured to acquire a depth from a distorted image, whether a static image or a frame of a video. For example, the depth acquisition unit 110 may acquire the depth from the distorted image using a stereo depth extraction algorithm or an auto focus (AF) algorithm. The depth acquisition unit 110 may be supplied with the depth of the distorted image from a time of flight (TOF) sensor. However, the present invention does not limit the method of acquiring the depth of distorted image to those stated herein. The depth acquisition unit 110 may acquire the depth from the distorted image using a variety of methods, such as those well known in the art.

In a case of photographing a still image, the depth acquisition unit 110 may acquire a depth of an image photographed by an image sensor (not shown). In a case of recording a video, the depth acquisition unit 110 may acquire a depth of at least one frame among a plurality of frames captured by an image sensor. While the video is being recorded, the depth acquisition unit 100 may acquire depths of frames captured by the image sensor on a real-time basis.

The grid generation unit 120 may be configured to dynamically generate a correction grid corresponding to the depth of a distorted image. The grid generation unit 120 may receive depth information of a distorted image from the depth acquisition unit 110. The grid generation unit 120 may dynamically generate a correction grid using the depth information of the distorted image and the projection matrix 121.

As expressed in Equation (1) below, the grid generation unit 120 may dynamically generate coordinates of the correction grid by performing operations of or applying the projection matrix 121, the coordinates of the original grid, and the depth of the distorted image.

$$\begin{bmatrix} u \\ v \\ 1 \end{bmatrix} = P \begin{bmatrix} x \\ y \\ z \end{bmatrix} \quad (1)$$

where u and v indicate coordinates of the correction grid, x and y indicate coordinates of the original grid, z indicates the depth of the distorted image, and P indicates the projection matrix. The coordinates of a grid may include coordinates of grid points (e.g., x,y,z).

The projection matrix 121 may be pre-stored in the grid generation unit 120. The projection matrix 121 may be defined by and represent curvature characteristics of a lens.

The distortion correction unit 130 may receive the distorted image and correct optical distortion in the distorted image to then output a corrected image with little or no distortion from the curvature of the lens. The distortion correction unit 130 may receive the correction grid from the grid generation unit 120, wherein the distortion correction unit 130 may automatically correct the optical distortion in the distorted image using the correction grid.

Since optical distortion correction using a correction grid is generally known to one skilled in the art, a detailed description thereof will be omitted.

Figure 2:
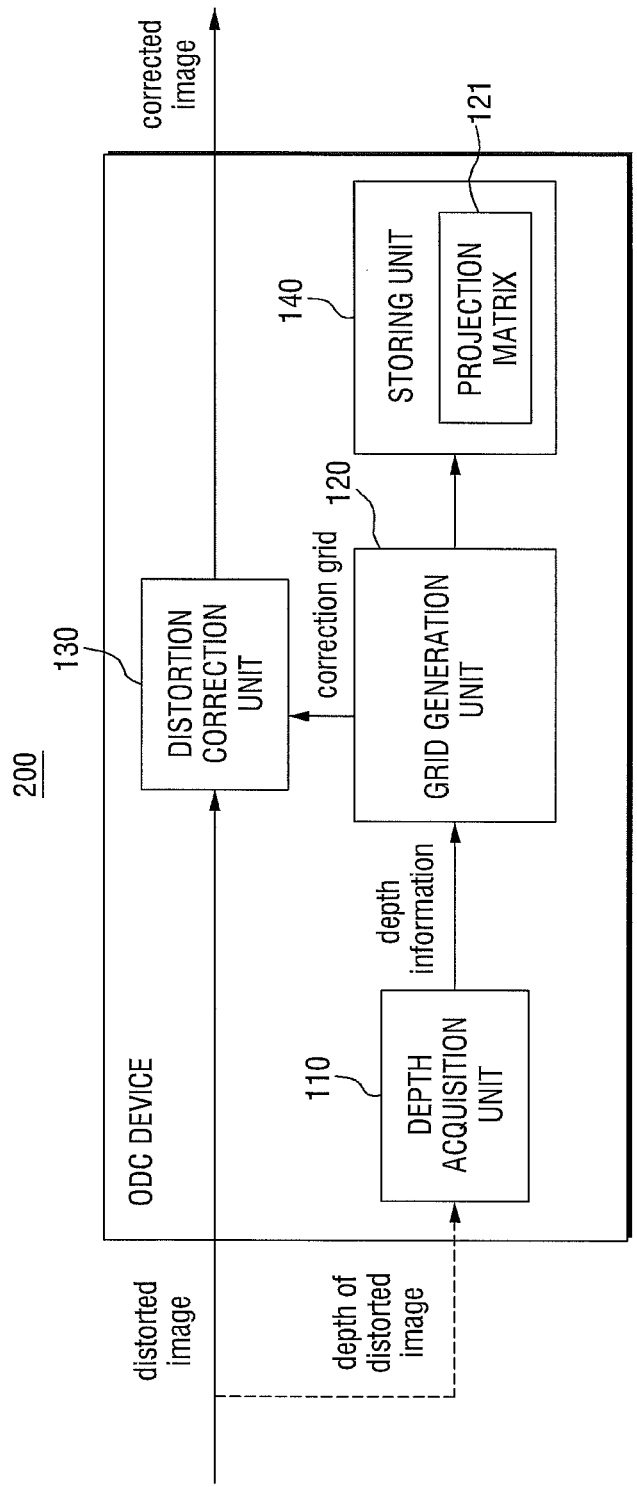
FIG. 2 is a block diagram of another embodiment of a depth information based ODC circuit according to aspects of the present invention.

FIG. 2 is a block diagram of another embodiment of a depth information based optical distortion correction (ODC) circuit according to aspects of the present invention. For the sake of convenient explanation, the following description will focus on differences from the ODC circuit 100 shown in FIG. 1.

Referring to the embodiment of FIG. 2, the ODC circuit 200 further includes a storing unit 140, when compared to the ODC circuit 100 shown in FIG. 1.

In the ODC circuit 200 embodiment of FIG. 2, a projection matrix 121 may be pre-stored in the storing unit 140. The storing unit 140 may include non-transitory storage circuit, for example, non-volatile memory, such as an electrically erasable programmable read only memory (EEPROM) or a flash memory, but aspects of the present invention are not limited thereto.

The grid generation unit 120 may access the storing unit 140 to refer to the projection matrix 121. The grid generation unit 120 may dynamically generate a correction grid using the depth information received from the depth acquisition unit 110 and the projection matrix 121 referred to by the storing unit 140.

Figure 3:
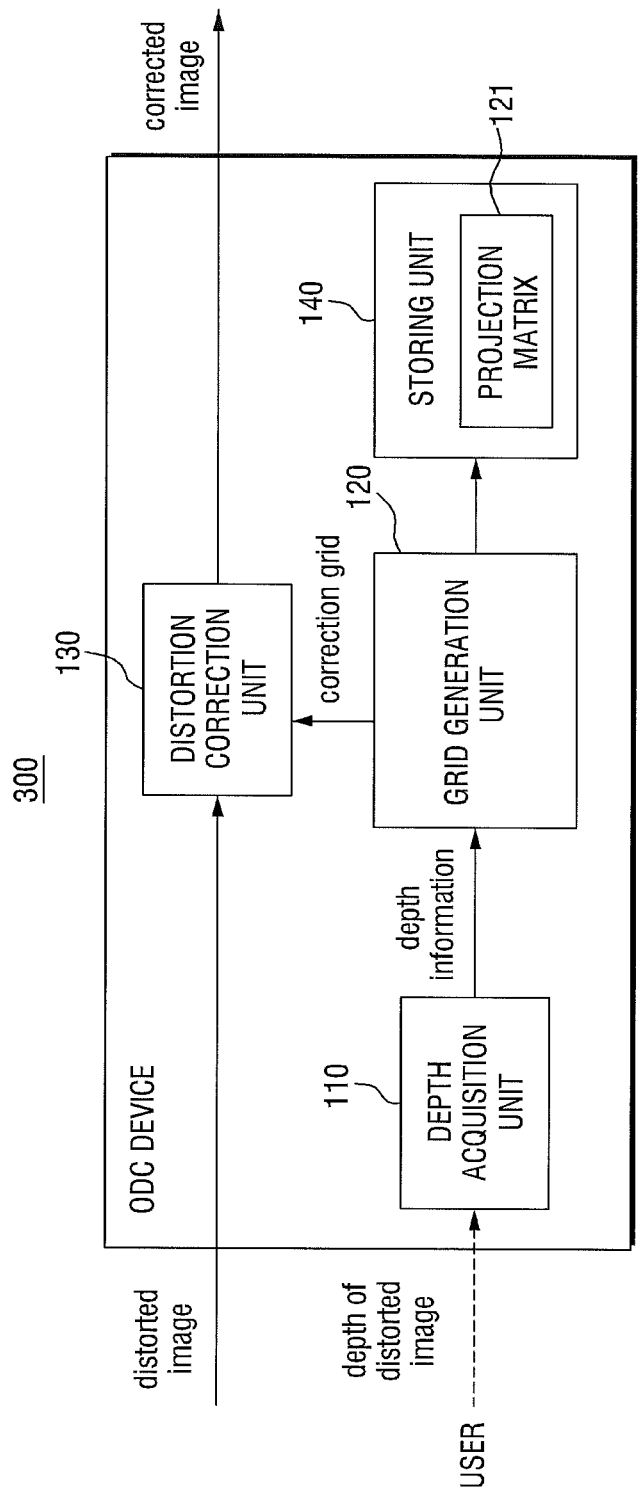
FIG. 3 is a block diagram of still another embodiment of a depth information based ODC circuit according to aspects of the present invention.

FIG. 3 is a block diagram of another embodiment of a depth information based optical distortion correction (ODC) circuit according to aspects of the present invention. For the sake of convenient explanation, the following description will focus on differences from the ODC circuit 200 shown in FIG. 2.

Referring to the embodiment of FIG. 3, in the ODC circuit 300, a depth of a distorted image is input by a user, unlike in the ODC circuit 200 shown in FIG. 2.

The user may manually input the depth of the distorted image using a variety of well-known input circuits, such as a keyboard, a mouse, a button, a keypad, or a touch screen. A depth acquiring unit 110 may acquire the depth input by the user.

As described above, in the ODC circuits according to some embodiments of the present invention, depths of first and second images are acquired, first and second correction grids corresponding to the depths of the first and second images are generated, and optical distortion in each of the first and second images may be corrected using the first and second correction grids. The depths of the first and second images may range from 0 (zero) to infinity (∞), or an approximation thereof. That is to say, in the ODC circuits according to some embodiments of the present invention, since correction grids corresponding to various depths of images are dynamically generated, accuracy of correcting optical distortion can be increased and consumption of a memory space for storing the correction grids can be reduced.

Meanwhile, in the ODC circuits according to some embodiments of the present invention, pre-processing may be required to calculate the projection matrix and to store the projection matrix. Hereinafter, the pre-processing of the ODC circuits according to some aspects of the present invention will be described with reference to the embodiments of FIGS. 4 and 5.

Figure 4:
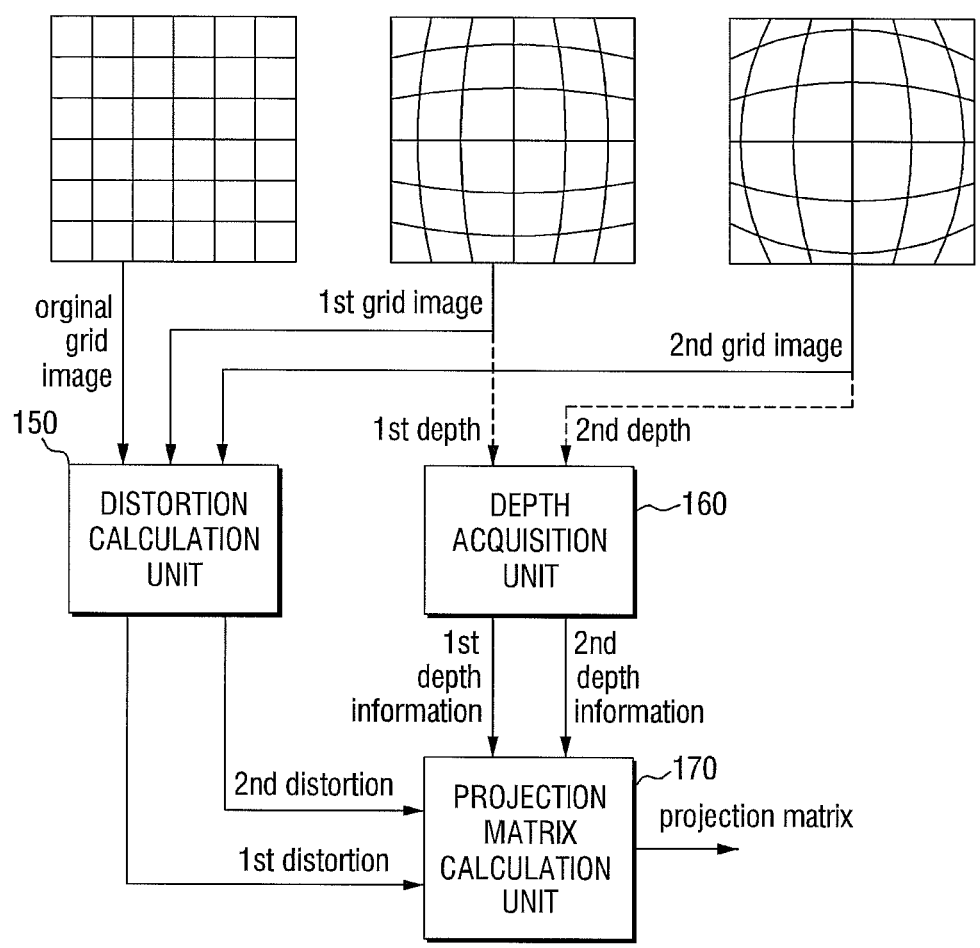
FIG. 4 is a block diagram illustrating an embodiment of a projection matrix calculating operation performed by some embodiments of a depth information based ODC circuits according to aspects of the present invention.
Figure 5:
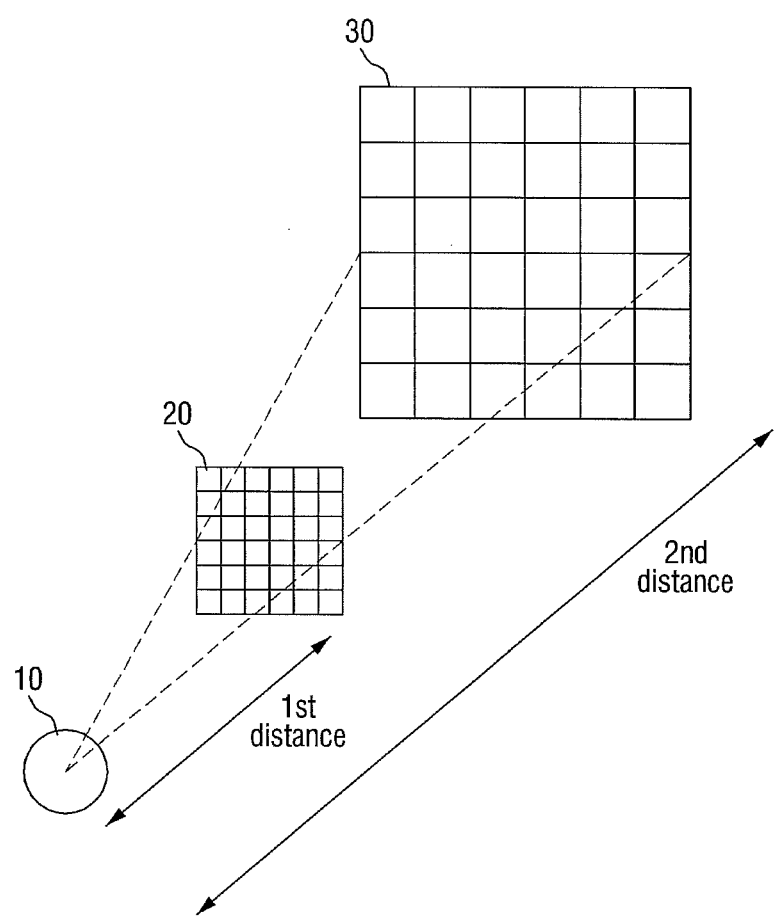
FIG. 5 is a conceptual diagram illustrating an embodiment of an operation or method of acquiring a first grid image and a second grid image in FIG. 1, according to aspects of the present invention.

FIG. 4 is a block diagram illustrating an embodiment of a projection matrix calculating operation performed by depth information based optical distortion correction (ODC) circuits according to some aspects of the present invention and FIG. 5 is a conceptual diagram illustrating an embodiment of an operation of method of acquiring a first grid image and a second grid image in FIG. 1.

Referring to the embodiment of FIG. 4, a distortion calculation unit 150 may receive first and second grid images.

As illustrated in the embodiment of FIG. 5, an image sensor (not shown) may photograph original grids 20 and 30, respectively positioned at first and second distances to acquire first and second grid images having different depths. In FIG. 5, reference numeral 10 denotes a lens. Due to curvature characteristics of the lens, optical distortion may be generated in each of the first and second grid images. Here, the first distance may be shorter than the second distance with respect to the lens. Alternatively, the first depth of the first grid image may be smaller than the second depth of the second grid image. Therefore, the extent of optical distortion in the second grid image may be greater than the extent of optical distortion in the first grid image.

Referring again to the embodiment of FIG. 4, the distortion calculation unit 150 may be configured to compare the first and second grid images with an original grid image and may calculate optical distortion in each of the first and second grid images. The distortion calculation unit 150 may calculate a deviation in distances between centers of the images and grid points as the extent of optical distortion. The original grid image may be stored in the distortion calculation unit 150 or in an external device (e.g., the storing unit 140) to then be supplied to the distortion calculation unit 150. Throughout the specification, the optical distortion in the first grid image and the optical distortion in the second grid image are defined as first distortion and second distortion, respectively, which will be described below in detail.

The depth acquisition unit 160 may acquire depths of the first and second grid images. As described above, the depth acquisition unit 160 may acquire the depths of the first and second grid images using a stereo depth extraction algorithm or an auto focus (AF) algorithm. The depth acquisition unit 160 may be supplied with the depths of the first and second grid images from a time of flight (TOF) sensor. Alternatively, the depth acquisition unit 160 may acquire the depths of the first and second grid images input by a user. Throughout the specification, the depths of the first and second grid images are defined as first and second depths, respectively, which will be described below in detail.

The projection matrix calculation unit 170 is configured to calculate the projection matrix using the first distortion and the second distortion and information about the first and second depths. The calculated projection matrix may be transmitted to the grid generation unit 120 to then be stored therein or transmitted to the storing unit 140 to then be stored therein.

In FIG. 4, barrel distortion is exemplified as the form of optical distortion being calculated and corrected for, but aspects of the present invention are not limited thereto. For example, pin-cushion distortion may also be calculated by the distortion calculation unit 150 and corrected for.

According to embodiments, the distortion calculation unit 150, the depth acquisition unit 160, and the projection matrix calculation unit 170, having been described with reference to FIG. 4, may be provided as internal components of the various embodiments of ODC circuits described herein, and otherwise able to be manufactured according to aspects of the present invention. The depth acquisition unit 110 (e.g., in FIGS. 1-3) and the depth acquisition unit 160 (e.g., in FIG. 4) may be provided as a single component. In this case, the ODC circuits according to some embodiments of the present invention may perform the pre-processing at the time of initial configuration or lens exchange.

Alternatively, the distortion calculation unit 150, the depth acquisition unit 160 and the projection matrix calculation unit 170, having been described with reference to the embodiment of FIG. 4, may be provided as components of an external device, and the ODC circuits according to some embodiments of the present invention may receive the calculated projection matrix from the external device. In addition, in stages of fabricating the ODC circuits according to some embodiments of the present invention, the projection matrix may be stored in the grid generation unit 120 or the storing unit 140.

Figure 6:
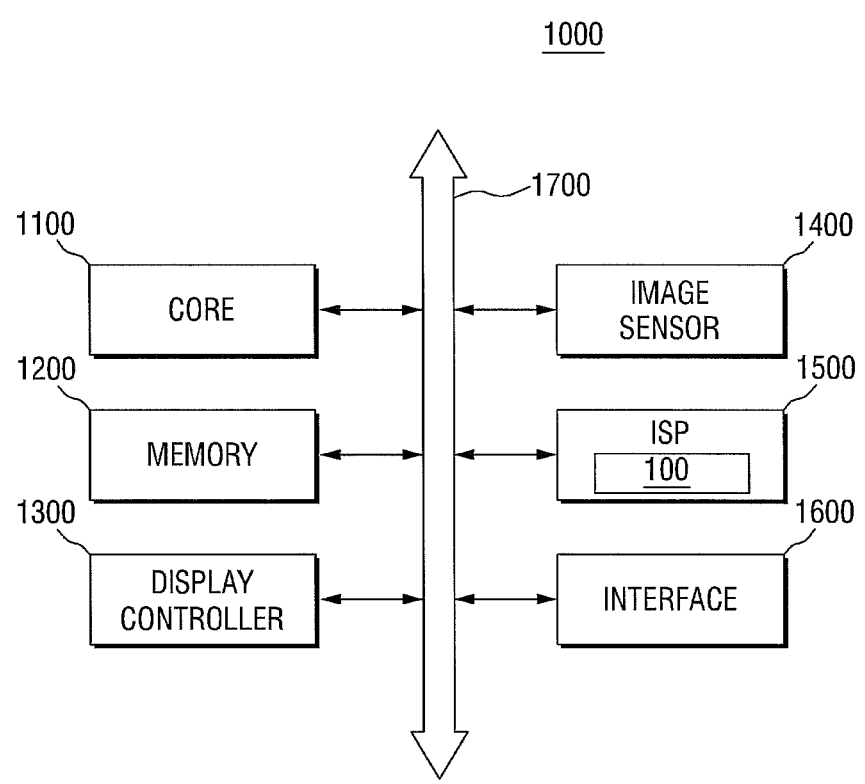
FIG. 6 is a block diagram of an embodiment of a system on chip including an embodiment of depth information based ODC circuit according to aspects of the present invention.

FIG. 6 is a block diagram of an embodiment of a system on chip (SOC) including depth information based optical distortion correction (ODC) circuits, according to aspects of the present invention.

Referring to the embodiment of FIG. 6, the system on chip 1000 may include a core processor (CORE) 1100, a memory 1200, a display controller 1300, an image sensor 1400, an image signal processor (ISP) 1500, an interface 1600, and a data bus 1700.

The core 1100, the memory 1200, the display controller 1300, the image sensor 1400, the ISP 1500, and the interface 1600 may be directly or indirectly connected to each other through the data bus 1700. The data bus 1700 may correspond to a path through which data moves, e.g., electrically conductive traces, wires or connections or optical cables, wires, fibers, or connectors.

The core 1100 may include one processor core (single-core) or a plurality of processor cores (multi-core) to process data. For example, the core 1100 may be a multi-core, such as a dual-core, a quad-core or a hexa-core. The core 1100 may further include a cache memory positioned inside or outside.

The memory 1200 may be configured to store data processed by the core 1100 and/or the ISP 1500 and/or programs executed by the core 1100 and/or the ISP 1500. The memory 1200 also may be configured to store data of, from, or representing images photographed by the image sensor 1400. The memory 1200 may include one or more volatile memories, such as a double data rate static DRAM (DDR SDRAM) or a single data rate SDRAM (SDR SDRAM), and/or one or more non-volatile memories, such as an electrical erasable programmable ROM (EEPROM) or a flash memory, as examples.

The display controller 1300 may control a display device to allow the display device to display an image.

The image sensor 1400 may photograph (or capture) an image, wherein the image sensor 1400 may receive an optical image signal through a lens (not shown) and may convert the received optical image signal into an electrical image signal. As examples, the image sensor 1400 may include a charge coupled diode (CCD) image sensor or a complementary metal oxide semiconductor (CMOS) image sensor.

The ISP 1500 may process the image signal photographed by the image sensor 1400. The ISP 1500, including each of the ODC circuits 100 to 300 according to some embodiments of the present invention, may correct optical distortion in the image photographed by the image sensor 1400. In some embodiment, the ISP 1500 may include the ODC circuit 100 shown in FIG. 1, as exemplified in the embodiment of FIG. 6. However, in other embodiments, the ISP 1500 may optionally include the ODC circuit 200 or 300 shown in FIGS. 2 and 3.

The interface device 1600 may be configured to transmit data to a communication network or may receive data from the communication network. The interface device 1600 may include, for example, an antenna, a wired/wireless transceiver, and so on.

Figure 7:
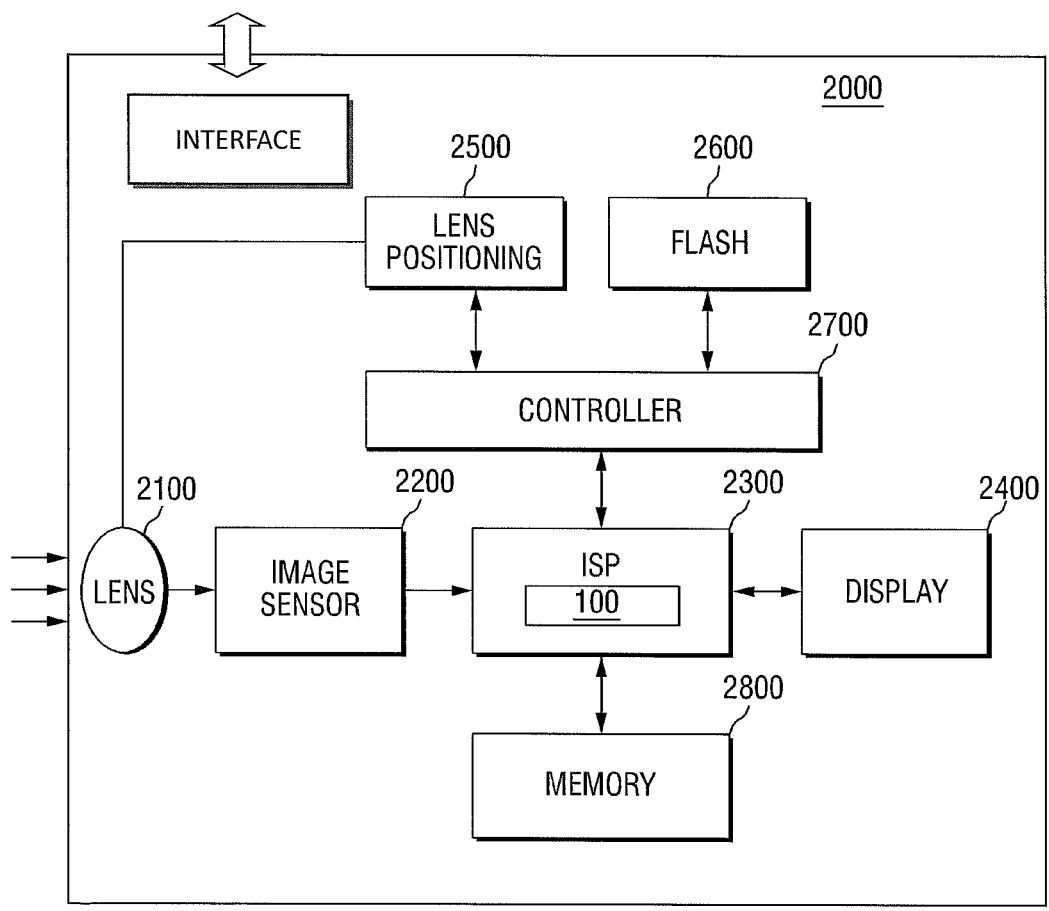
FIG. 7 is a block diagram of an embodiment of a user system including a depth information based ODC circuit according to aspects of the present invention.

FIG. 7 is a block diagram of an embodiment of a user system including a depth information based optical distortion correction (ODC) circuit, according to aspects of the present invention.

Referring to the embodiment of FIG. 7, the user system 2000 may include a lens 2100, an image sensor 2200, an image signal processor (ISP) 2300, a display 2400, a lens positioning device 2500, a flash 2600, a controller 2700, and a memory 2800.

The image sensor 2200 may photograph (or capture) an image, wherein the image sensor 2200 may receive an optical image signal through a lens 2100 and may convert the received optical image signal into an electrical image signal. For example, the image sensor 2200 may include a charge coupled diode (CCD) image sensor or a complementary metal oxide semiconductor (CMOS) image sensor.

The ISP 2300 may process the image signal photographed by the image sensor 2200. The ISP 2300, including each of the ODC circuits 100 to 300 according to some embodiments of the present invention, may correct optical distortion in the image photographed by the image sensor 2200. The ISP 2300 including the ODC circuit 100 shown in FIG. 1 is exemplified in the embodiment of FIG. 7. However, the ISP 2300 may optionally include the ODC circuit 200 or 300 shown in FIGS. 2 and 3.

The display unit 2400 may display the image processed by the ISP 2300. The display 2400 may include, as examples, a liquid crystal display (LCD) or an organic light emitting diode (OLED) display panel. These should be considered non-limiting examples.

The lens positioning 2500 device may be configured to adjust a focal distance using an AF algorithm and may adjust the position of the lens according to the adjusted focal distance. The flash 2600, including a light source, a reflector, etc., may emit light. The controller 2700 may be configured to control the overall operation of the user system 2000.

The memory 2800 may store data processed by the ISP 2300 and/or programs executed by the ISP 2300. The memory 2800 may include, for example, one or more volatile memories, such as a double data rate static DRAM (DDR SDRAM), a single data rate SDRAM (SDR SDRAM) or a SRAM, and/or one or more non-volatile memories, such as an electrical erasable programmable ROM (EEPROM) or a flash memory. In various embodiments, the memory 2800 may be combined with the user system 2000 in the form of a memory card.

In the embodiment of FIG. 7, the user system 2000 may further include an interface 2900 configured to transmit data to a communication network or receive data from the communication network. The interface 2900 may include, for example, an antenna or a wired/wireless transceiver.

According to embodiments, the user system 2000 may be an arbitrary pick-up or handheld device, such as a digital camera, a compact camera, a high-end camera, or a digital single lens reflex (DLSR) camera.

Figure 8:
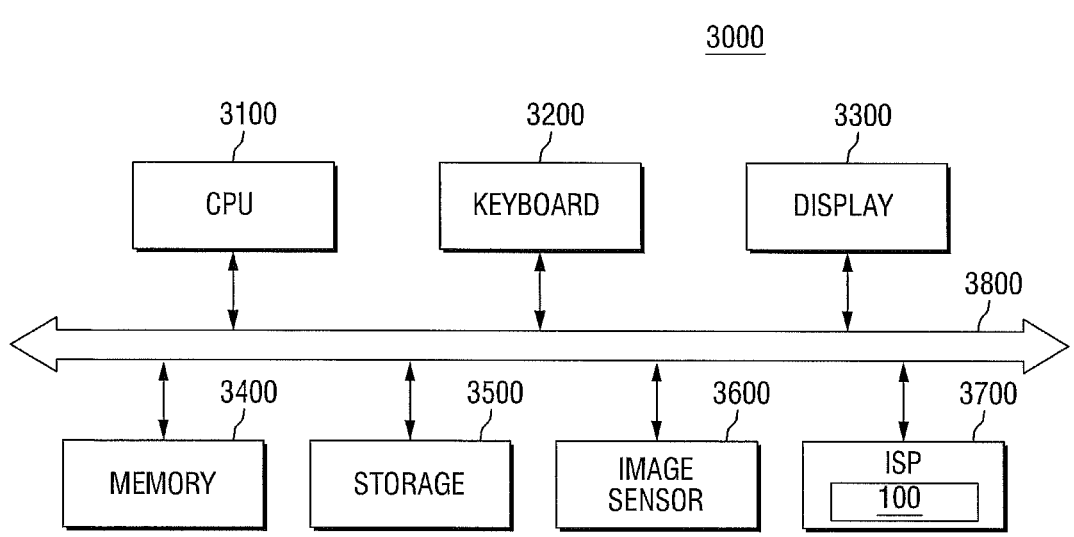
FIG. 8 is a block diagram of another embodiment of a user system including a depth information based ODC circuit according to aspects of the present invention.

FIG. 8 is a block diagram of an embodiment of another user system including a depth information based optical distortion correction (ODC) circuit according to some embodiments of the present invention.

Referring to the embodiment of FIG. 8, the user system 3000 may include a central processing unit (CPU) 3100, a keyboard 3200, a display 3300, a memory 3400, a storage 3500, an image sensor 3600, an image signal processor (ISP) 3700, and a data bus 3800.

The CPU 3100, the keyboard 3200, the display 3300, the memory 3400, the storage 3500, the image sensor 3600 and the ISP 3700 may be connected to each other through the data bus 3800. The data bus 3800 may correspond to a path through which data moves, including various types of known forms of data paths.

The CPU 3100, including a controller, an operation device, etc., may execute a program and may process data. In various embodiments, the CPU 3100 may further include a cache memory positioned inside or outside user system 3000.

The keyboard 3200, including a plurality of keys, may receive letters or digits from a user or may receive data through various function keys. The display 3300, including one or more displays, may display images. In some embodiments, the keyboard 3200 and display 3300 may be combined in the form of a touchscreen or the like, as an example.

The memory 3400 may include one or more volatile memories, such as a double data rate static DRAM (DDR SDRAM), a single data rate SDRAM (SDR SDRAM) or a SRAM, as examples. The volatile memories may function as a working memory for storing the data processed by the CPU 3100. Alternatively, the volatile memories may store the data processed by the ISP 3700.

The memory 3400 may include one or more non-volatile memories, such as an EEPROM or a flash memory, as examples. The non-volatile memories may store the programs executed by the CPU 3100 and/or the ISP 3700.

The storage 3500, including a recording media, such as a floppy disk, a hard disk, a CD-ROM, a DVD, or other non-transitory media, may store data and/or programs.

The image sensor 3600 may photograph or capture an image. The image sensor 3600 may receive an optical image signal through at least one lens and may convert the received optical image signal into an electrical image signal. As examples, the image sensor 3600 may include a charge coupled diode (CCD) image sensor or a complementary metal oxide semiconductor (CMOS) image sensor.

The ISP 3700 may process the image signal photographed by the image sensor 3600. The ISP 3700, including one of the ODC circuits 100 to 300, as examples, may correct optical distortion in the image photographed by the image sensor 3600. In this embodiment, the ISP 3700 includes the ODC circuit 100 shown in FIG. 1, as exemplified in FIG. 8. However, in other embodiments, the ISP 3700 may optionally include one of the ODC circuits 200 or 300 shown in FIGS. 2 and 3.

Although not particularly shown in FIG. 8, the user system 3000 may further include one or more other types of input devices, such as a mouse, a button, a keypad, a touch screen or a microphone, and/or one or more output devices, such as a speaker, projector, and so on.

In addition, the user system 3000 may further include an interface 3900 transmitting data to a communication network or receiving data from the communication network. The interface may include, for example, an antenna or a wired/wireless transceiver.

According to various embodiments, the user system 3000 may be an arbitrary computing system, such as a mobile phone, a smart phone, a personal digital assistant (PDA), a desktop, a notebook computer, or a tablet PC, as examples.

Figure 9:
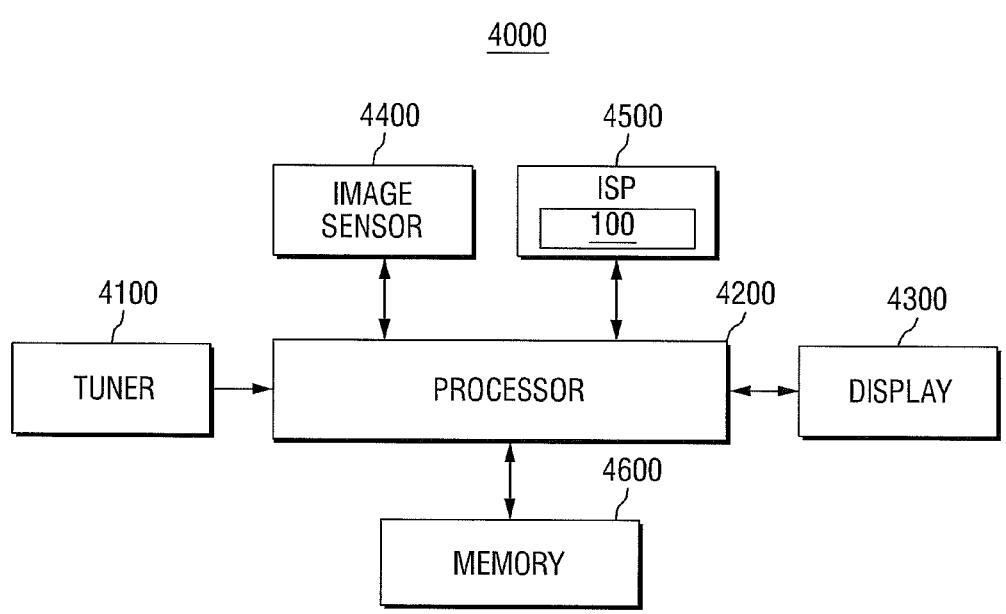
FIG. 9 is a block diagram of still another embodiment of a user system including a depth information based ODC circuit according to aspects of the present invention.

FIG. 9 is a block diagram of still another user system including depth information based optical distortion correction (ODC) circuits according to some embodiments of the present invention.

Referring to the embodiment of FIG. 9, the user system 4000 may include a tuner 4100, a processor 4200, a display 4300, an image sensor 4400, an image signal processor (ISP) 4500, and a memory 4600.

The tuner 4100 may be configured to receive a broadcasting signal. The tuner 4100 may receive an analog broadcasting signal or a digital broadcasting signal. Alternatively, the tuner 4100 may also be configured to receive a terrestrial broadcasting signal, a cable broadcasting signal, or a satellite broadcasting signal, or combinations thereof.

The processor 4200 may be configured to control the overall operation of the user system 4000.

The display 4300 may be configured to display the broadcasted signal received from the tuner 4100 or the image processed by the ISP 2300. The display 4300 may include, for example, a liquid crystal display (LCD) or an organic light emitting diode (OLED) display panel, or other displays.

The image sensor 4400 may be configured to photograph or capture an image. The image sensor 4400 may receive an optical image signal through a lens (not shown) and may convert the received optical image signal into an electrical image signal. For example, the image sensor 4400 may include a charge coupled diode (CCD) image sensor or a complementary metal oxide semiconductor (CMOS) image sensor.

The ISP 4500 may process the image signal photographed by the image sensor 4400. The ISP 4500, including one of the ODC circuits 100 to 300 according to some embodiments of the present invention, may correct optical distortion in the image photographed by the image sensor 4400. The ISP 4500 including the ODC circuit 100 shown in FIG. 1 as an example in FIG. 9. However, in other embodiments, the ISP 4500 may optionally include one of the ODC circuits 200 or 300 shown in FIGS. 2 and 3.

The memory 4600 may store data processed by the processor 4200 and/or the ISP 4500 and/or programs executed by the ISP 4500. The memory 4600 may also store the image photographed by the image sensor 4400. The memory 4600 may include, for example, one or more volatile memories, such as a double data rate static DRAM (DDR SDRAM), a single data rate SDRAM (SDR SDRAM) or a SRAM, and/or one or more non-volatile memories, such as an electrical erasable programmable ROM (EEPROM) or a flash memory, as examples.

According to embodiments, the user system 4000 may be an arbitrary broadcast receiver, such as a cable receiver, digital television (TV), or a smart TV, as examples.

Hereinafter, an embodiment of a depth information based optical distortion correction (ODC) method according to aspects of the present invention will be described with reference to FIGS. 10 to 12. For the sake of convenience, detailed descriptions of already discussed subject matter will be omitted.

Figure 10:
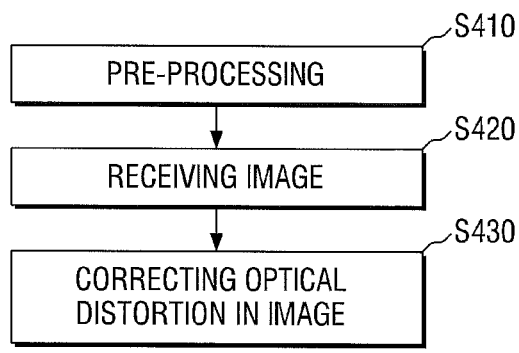
FIG. 10 is a flowchart illustrating an embodiment of a depth information based ODC method according to aspects of the present invention.
Figure 11:
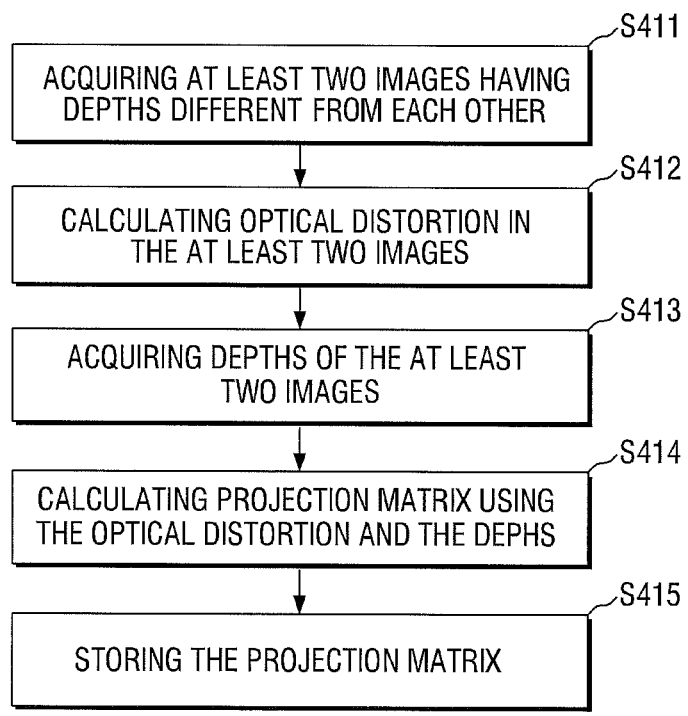
FIG. 11 is a flowchart specifically illustrating an embodiment of the pre-processing function shown in FIG. 10.
Figure 12:
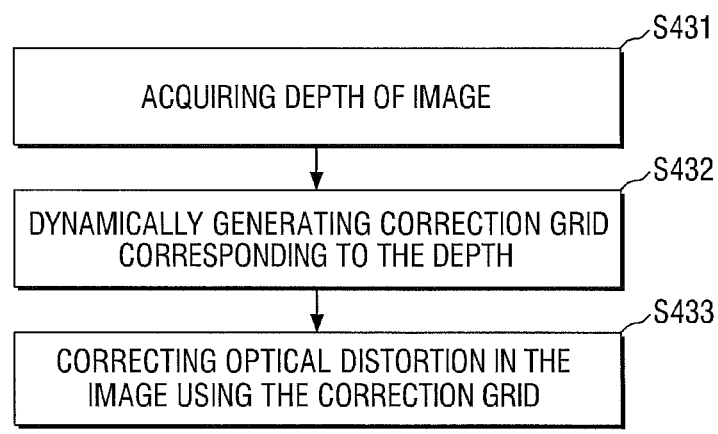
FIG. 12 is a flowchart specifically illustrating an embodiment of the optical distortion correction function shown in FIG. 10.

FIG. 10 is a flowchart illustrating an embodiment of a depth information based optical distortion correction (ODC) method according to aspects of the present invention, FIG. 11 is a flowchart specifically illustrating an embodiment of pre-processing shown in FIG. 10, and FIG. 12 is a flowchart specifically illustrating an embodiment of optical distortion correction shown in FIG. 10.

Referring to the embodiment of FIG. 10, in the depth information based optical distortion correction (ODC) method, pre-processing is first performed to generate a projection matrix (S410). The pre-processing will be described in more detail with reference to FIG. 11.

Referring to the embodiment of FIG. 11, in the pre-processing (S410) step, at least two images having different depths are first acquired (S411). Here, the at least two images may be images of original grids positioned at different distances. Different extents of optical distortion may be generated in the at least two images having different depths.

Next, the optical distortion in each of the at least two images is calculated (S412). The at least two images may be compared with the original grid image to calculate the optical distortion in each of the at least two images.

Next, depths of the at least two images are acquired (S413). The depths of the at least two images may be acquired using a stereo depth extraction algorithm, an auto focus (AF) algorithm or a time of flight (TOF) sensor, as examples.

Next, a projection matrix is calculated using the calculated optical distortion in each of the at least two images and the acquired depths of the at least two images (S414), and the calculated projection matrix is stored (S415).

In some embodiments, as shown in FIG. 11, after acquiring the depths of the at least two images (S411), the optical distortion in each of the at least two images may be calculated (S412). Optionally, in some embodiments, the calculating of the optical distortion (S412) and the acquiring of the depths of the at least two images (S413) may be performed at the same time.

Next, referring again to FIG. 10, a distorted image is photographed (or captured) and received by an image sensor (S420), e.g., via a lens. As examples, the image sensor may include a charge coupled diode (CCD) image sensor or a complementary metal oxide semiconductor (CMOS) image sensor. Next, optical distortion in the distorted image is corrected (S430). The correcting of the optical distortion will be described in more detail with reference to FIG. 12.

Referring to the embodiment of FIG. 12, in the correcting of the optical distortion (S430), the depth of the distorted image is acquired (S431). The depth of the distorted image may be acquired using a stereo depth extraction algorithm, an auto focus (AF) algorithm or a time of flight (TOF) sensor, as examples.

Next, a correction grid corresponding to the depth of the distorted image is dynamically generated (S432). Here, coordinates of the correction grid may be generated using coordinates of the original grid, depth information of the distorted image and the projection matrix. Coordinates of a grid may include coordinates of grid points (e.g., x,y,z).

Next, the optical distortion in the distorted image is corrected using the correction grid (S433). The corrected image may be stored, transmitted, or otherwise output.

Those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. It is intended by the following claims to claim that which is literally described and all equivalents thereto, including all modifications and variations that fall within the scope of each claim.

What is claimed is:

1. A depth information based optical distortion correction (ODC) circuit, comprising:
    a processor, the processor comprising:
        a depth acquisition unit configured to acquire a depth of an image;
        a projection matrix calculation unit configured to calculate the projection matrix using an optical distortion in at least two images captured by an image sensor and having different depth information of at least two images;
        a grid generation unit configured to dynamically generate a correction grid corresponding to the depth of the image using depth information of the image and a projection matrix; and
        a distortion correction unit configured to correct optical distortion in the image using the correction grid.

2. The ODC circuit of claim 1, wherein the grid generation unit is configured to generate coordinates of the correction grid using coordinates of an original grid, the depth information of the image, and the projection matrix.

3. The ODC circuit of claim 1, the processor further comprising: a distortion calculation unit configured to compare the at least two images with the original grid and to calculate the optical distortion of each of the at least two images.

4. The ODC circuit of claim 1, wherein the depth acquisition unit is configured to acquire the depths of the at least two images.

5. The ODC circuit of claim 1, further comprising:
    a storing unit storing the projection matrix.

6. The ODC circuit of claim 1, wherein the depth acquisition unit is configured to acquire a depth of at least one frame among a plurality of frames captured by an image sensor.

7. The ODC circuit of claim 1, wherein the depth acquisition unit is configured to acquire the depth of the image using a stereo depth extraction algorithm.

8. The ODC circuit of claim 1, wherein the depth acquisition unit is configured to acquire the depth of the image using an auto focus (AF) algorithm.

9. The ODC circuit of claim 1, wherein the depth acquisition unit is configured to acquire the depth of the image provided from a time of flight (TOF) sensor.

10. The ODC circuit of claim 1, wherein the depth acquisition unit is configured to acquire the depth of the image input by a user.

11. A depth information based optical distortion correction (ODC) method, the method comprising:
- acquiring at least two images having different depths using an image sensor;
- calculating a projection matrix using optical distortion in the at least two images and depths of the two images;
- dynamically generating a correction grid corresponding to the depth of the image using the depth information of the image and a projection matrix; and
- correcting optical distortion in the image using the correction grid.

12. The ODC method of claim 11, wherein the dynamically generating of the correction grid corresponding to the depth of the image comprises dynamically generating coordinates of the correction grid using coordinates of an original grid, the depth information of the image, and the projection matrix.

13. The ODC method of claim 11, wherein the pre-processing further comprises storing the projection matrix in a storage media.

14. An imaging system with depth information based optical distortion correction (ODC), comprising:
- a memory having stored therein a projection matrix;
- an image sensor configured to receive an optical image signal from an image captured through at least one lens and to convert the received optical image signal into an electrical image signal;
- an image signal processor configured to process the electrical image signal into a distortion corrected optical image, the image signal processor comprising:
    - a depth acquisition unit configured to acquire a depth of the image;
    - a projection matrix calculation unit configured to calculate the projection matrix using an optical distortion in at least two images captured by an image sensor and having different depths, and the depth information of the at least two images;
    - a grid generation unit configured to dynamically generate a correction grid corresponding to the depth of the image using depth information of the image and the projection matrix; and
    - a distortion correction unit configured to correct optical distortion in the image using the correction grid; and
- a display controller configured to output the corrected optical image to a display.

15. The system of claim 14, wherein the grid generation unit is configured to generate coordinates of the correction grid using coordinates of an original grid, the depth information of the image, and the projection matrix.

16. The system of claim 14, further comprising:
- a distortion calculation unit configured to compare the at least two images with the original grid and to calculate the optical distortion of each of the at least two images.

17. The system of claim 14, wherein the depth acquisition unit is configured to acquire the depth of the image using an auto focus (AF) algorithm; a time of flight (TOF) sensor; or by an input by a user.

* * * * *